United States Patent
Arsanjani et al.

(10) Patent No.: US 10,289,387 B2
(45) Date of Patent: May 14, 2019

(54) ARCHITECTING AND DEFINING EXTENSIBLE METHODS AND PROCESSES TO BUILD HYBRID SOLUTIONS

(71) Applicant: International Business Machines Corporation, Armonk, NY (US)

(72) Inventors: Ali P. Arsanjani, Fairfield, IA (US); Shuvanker Ghosh, Tampa, FL (US); Kerrie L. Holley, Montara, CA (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 14/941,743

(22) Filed: Nov. 16, 2015

(65) Prior Publication Data
US 2016/0070540 A1    Mar. 10, 2016

Related U.S. Application Data

(63) Continuation of application No. 12/698,295, filed on Feb. 2, 2010, now Pat. No. 9,224,119.

(51) Int. Cl.
*G06F 9/44* (2018.01)
*G06F 8/10* (2018.01)
(Continued)

(52) U.S. Cl.
CPC ............... *G06F 8/10* (2013.01); *G06F 8/20* (2013.01); *G06Q 10/067* (2013.01); *G06Q 10/103* (2013.01); *Y04S 10/54* (2013.01)

(58) Field of Classification Search
CPC .... G06Q 10/06; G06Q 10/106; G06Q 10/067; G06F 8/10; G06F 8/34; G06F 8/20
(Continued)

(56) References Cited

U.S. PATENT DOCUMENTS

| 5,634,127 A | 5/1997 | Cloud et al. |
| 7,469,402 B2 * | 12/2008 | Bender ..................... G06F 8/20 |
| | | 717/104 |

(Continued)

OTHER PUBLICATIONS

Ali Arsanjani, "Service-oriented modeling and architecture", Nov. 9, 2004, http://www.ibm.com/developerworks/library/ws-soa-design1/, 9 pages.

(Continued)

*Primary Examiner* — Idriss N Alrobaye
*Assistant Examiner* — Brooke J Taylor
(74) *Attorney, Agent, or Firm* — Jay Wahlquist; Hunter E. Webb; Keohane & D'Alessandro PLLC

(57) ABSTRACT

A method and system defines a mechanism to architect and define extensible methods and processes to build hybrid solutions. Solution templates provide a mechanism to architect and define the software development method in an extensible way and it enables the method architecture to be flexible to assemble method content and process elements only for those solution types that are necessary for a given solution. Solution templates keep the common base method lightweight and reusable and control the proliferation of software development processes necessary to build hybrid solutions by defining the solution templates for each of the solution types as pluggable extensions or add-ons to the base method that can be assembled on demand based on project needs.

19 Claims, 6 Drawing Sheets

(51) Int. Cl.
*G06Q 10/06* (2012.01)
*G06Q 10/10* (2012.01)
*G06F 8/20* (2018.01)

(58) Field of Classification Search
USPC .......................................................... 717/101
See application file for complete search history.

(56) References Cited

U.S. PATENT DOCUMENTS

| | | | |
|---|---|---|---|
| 7,634,737 | B2 | 12/2009 | Beringer et al. |
| 7,930,203 | B2 | 4/2011 | Barnes et al. |
| 2002/0049749 | A1 | 4/2002 | Helgeson et al. |
| 2003/0014409 | A1 | 1/2003 | Shukoor |
| 2003/0135657 | A1* | 7/2003 | Barker ................ G06F 8/20 719/310 |
| 2004/0133413 | A1 | 7/2004 | Beringer et al. |
| 2005/0044524 | A1* | 2/2005 | Murray ............ G06F 9/44526 717/101 |
| 2007/0043992 | A1* | 2/2007 | Stevenson ............ G06F 8/20 714/732 |
| 2007/0282627 | A1 | 12/2007 | Greenstein et al. |
| 2008/0301626 | A1* | 12/2008 | Sivaram ................ G06F 8/10 717/104 |
| 2009/0006147 | A1 | 1/2009 | Padmanabhan |
| 2009/0012800 | A1 | 1/2009 | Devarakonda et al. |
| 2010/0083212 | A1* | 4/2010 | Fritzsche ............ G06F 8/34 717/104 |
| 2010/0257446 | A1 | 10/2010 | Woolfe et al. |
| 2011/0035322 | A1 | 2/2011 | Lively |
| 2011/0191744 | A1 | 8/2011 | Arsanjani et al. |

OTHER PUBLICATIONS

Brooke Jazmond Taylor, USPTO Office Action, U.S. Appl. No. 12/698,295, dated Sep. 11, 2012, 10 pages.
Brooke Jazmond Taylor, USPTO Final Office Action, U.S. Appl. No. 12/698,295, dated Dec. 13, 2012, 7 pages.
Brooke Jazmond Taylor, USPTO Office Action, U.S. Appl. No. 12/698,295, dated Oct. 7, 2013, 22 pages.
Brooke Jazmond Taylor, USPTO Final Office Action, U.S. Appl. No. 12/698,295, dated May 6, 2014, 6 pages.
Brooke Jazmond Taylor, USPTO Notice of Allowance and Fee(s) Due, U.S. Appl. No. 12/698,295, dated Aug. 14, 2015, 11 pages.

* cited by examiner

300 — Solution Template has Two Parts 1) WBS and 2) Placeholder

302

304 —

Base Delivery Process has Placeholders for Solution Templates. A Part of the Solution Template fills in (contributes to) the Placeholders.

ARCHITECTING AND DEFINING EXTENSIBLE METHODS AND PROCESSES TO BUILD HYBRID SOLUTIONS

CROSS-REFERENCE TO RELATED APPLICATION

This application is a continuation of, and claims the benefit of, co-pending and co-owned U.S. patent application Ser. No. 12/698,295, filed Feb. 2, 2010, the entire contents of which are herein incorporated by reference.

FIELD OF THE INVENTION

The present invention relates to a method or system to architect and define extensible methods and processes to build hybrid solutions.

BACKGROUND OF THE INVENTION

Today's projects tend to gravitate around solutions that are hybrid in nature: composed of multiple solution types viz. custom development, legacy integration and transformation, package application integration, e.g., SAP Netweaver, Oracle Fusion or composite business services. SAP Netweaver is SAP's integrated technology platform and is the technical foundation for all SAP applications since the SAP Business Suite. SAP® and SAP Netweaver® are trademarks of SAP AG. Oracle Fusion Middleware (OFM, also known as Fusion Middleware) consists of a portfolio of software products from Oracle Corporation. Oracle is a trademark of Oracle Corporation. Oracle® and Oracle Fusion® are registered trademarks of Oracle Corporation. The actual combination of solution types composing the overall solution varies from project to project, organization to organization, and yet the incorporation of various types of solution development styles must be handled and integrated within a single project or enterprise context, e.g., for client engagements.

Today's client solutions are hybrid in nature, composed of multiple solution types and they increase in complexity with varying scope, such as the difference between enterprise and a single project.

Today's solutions may require some or all of the following:
  Custom Development;
  Packaged Application Integration (PAI);
  Legacy Integration and Transformation (LIT);
    Host/Legacy Integration;
    Host/Legacy Transformation—Extract and expose hitherto embedded functionality;
  Composite Business Services (CBS);
    Compose an application out of a set of business services through choreography and semantic routing;
  SOA Integration (SOA-I);
    Integrate systems using service interfaces (the next evolution after enterprise application integration or EAI) using service oriented architecture (SOA);
  Integrate with IT Strategy and Enterprise Architecture;

Since software development project solutions are hybrid and composed of a set of different solution types, therefore the normative and prescriptive guidance on phases, activities, tasks, roles, work products and best-practices required for each of the individual solution types although needed, must be allowed to be selectively added to a base software development method or process as the overall solution is being composed of multiple solution types. To be extensible, base methods and base processes should include only the common set of activities, tasks, roles, work products and guidance applicable across all solution types. Unique solution type tasks, etc., should be selectively added as a project will call for the ability to select and incorporate additional activities, roles, work products needed to support a specific client solution into the base processes during method adoption at the time of project startup.

Pre-defining/publishing processes for all permutation and combination of solution types composing the client solutions is sub-optimal answer to the problem statement because of proliferation of these published/pre-defined processes.

Therefore, there is a need to solve the problems associated as described above.

SUMMARY OF THE INVENTION

The present invention of solution templates enables software development methods such as IBM's service-oriented modeling and Architecture™ (SOMA) method to facilitate building and delivering hybrid solutions composed of multiple solution types such as custom development, legacy integration and transformation, package application integration and so on. A set of solution types required for an overall solution varies from project to project, from client to client. Therefore, it does not justify including method content, work breakdown structure, and guidance associated with all the specific solution types in a base method/delivery process. Method content, work breakdown structure and guidance associated with the specific solution types are defined separately in solution templates in SOMA as a pluggable extensions or add-ons to the base method; thus SOMA delivery processes only include common base. The solution templates of the present invention are not designed to be used standalone rather associated with a set of base delivery processes. The solution templates provide a mechanism to integrate and assemble the method content, work breakdown structure and guidance for a set solution types required in a project to design and build the overall solution. The solution templates help in controlling the proliferation of published delivery processes.

The present invention of solution template enables method architecture to be flexible to facilitate method adoption to build hybrid solutions. The solution template of the present invention externalizes concerns such as tasks, work products, roles, guidance—for a specific solution types from the base method/delivery process. The solution template of the present invention modularizes the method content and externalizes the variations from the commonality in the processes. Solution templates are context-specific pluggable extensions to a base work breakdown structure (or delivery process) that are non-unitary (does not appear in one place in the delivery process in which it is plugged in).

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

The present invention comprises a method and system for the notion of a solution template that enables method architecture to be flexible to facilitate method adoption to build hybrid solutions composed of multiple solution types such as custom development, legacy integration and transformation, package application integration and so on. The solution template externalizes concerns—tasks, work products, roles, guidance—for a specific solution types from the base method/delivery process. The solution template modularizes the method content and externalizes the variations from the commonality in the processes. The solution template of the present invention enables flexible method architecture to facilitate method adoption to build hybrid solutions.

Solution templates of the present invention are context-specific pluggable extensions to a base work breakdown structure (or delivery process) that are non-unitary (does not appear in one place in the delivery process in which it is plugged in).

IBM SOMA method along with the notion of solution templates of the present invention enables the paradigm where a solution can be composed of multiple solution types and built on multiple implementation platforms. The flexible method architecture of SOMA method enabled by solution templates of the present invention allows integration and assembly of activities, tasks, guidance for a set of solution types to the base method on demand based on specific needs of a project. A software engineering method is designed to address the requirements of delivering generic.

Figure 1:
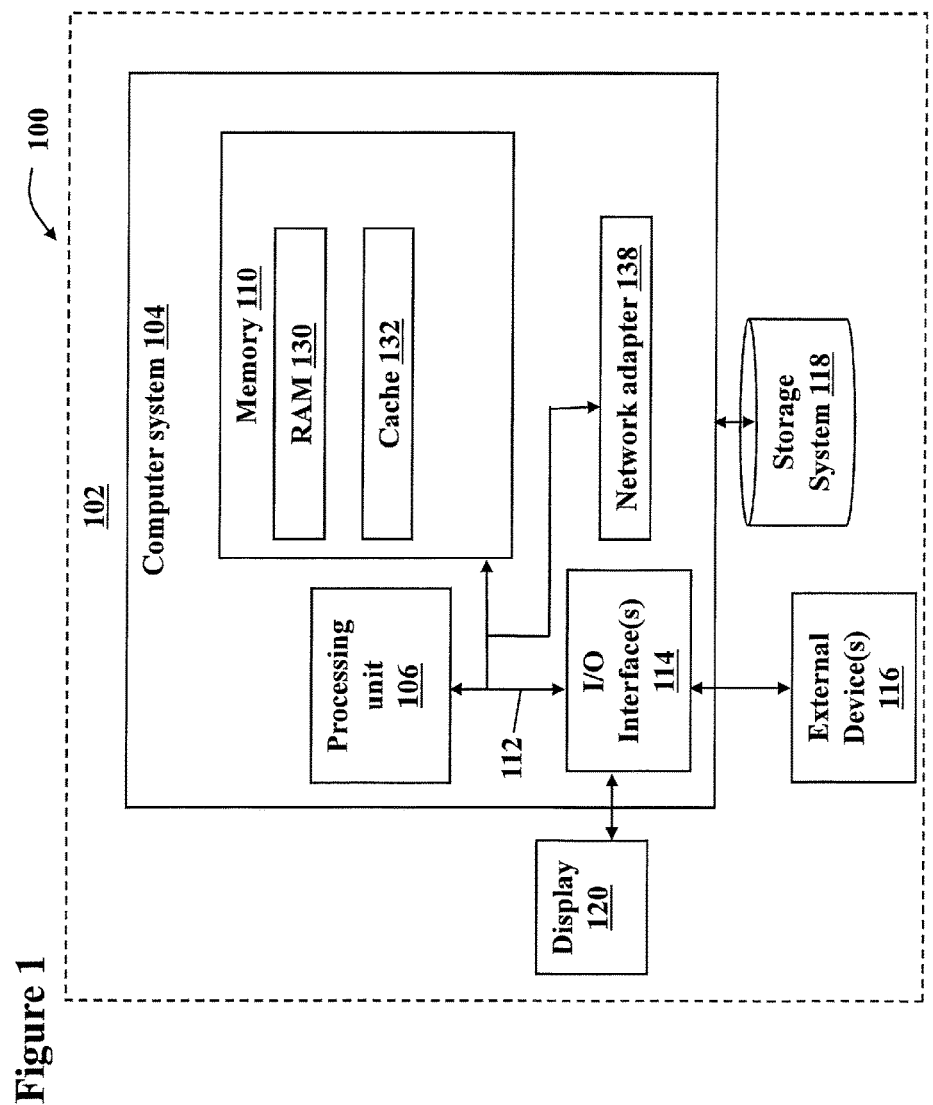
FIG. 1 shows a data processing system suitable for implementing an embodiment of the present invention.

FIG. 1 shows a system 100 that may have a data processing system 102 suitable for implementing an embodiment of the present invention. Data processing system 102 may have a computer system 104 connected to a display 120, external device(s) 116 or other peripheral devices for providing a user an interface to computer system 104 being connected via I/O interface(s) 114. Computer system 104 may have an internal bus 112 for providing internal communication between such modules as processing unit 106, I/O interface(s) 114, network adapter 138 and memory 110. Memory 110 may have random access memory (RAM) 130, cache 132 and storage system 118 or other forms of memory.

RAM may take the form of integrated circuits that allow stored data to be accessed in any order, that is, at random. Storage system 118 may take the form of tapes, magnetic discs and optical discs and are generally used for long term storage of data. Cache 132 is a memory for storing a collection of data—duplicating original values stored elsewhere or computed earlier, where the original data is expensive to fetch (owing to longer access time) or to compute, compared to the cost of reading the cache. In other words, a cache is a temporary storage area where frequently accessed data can be stored for rapid access. Once the data is stored in the cache, it can be used in the future by accessing the cached copy rather than re-fetching or re-computing the original data. A cache has proven to be extremely effective in many areas of computing because access patterns in typical computer applications have locality of reference.

Figure 2:
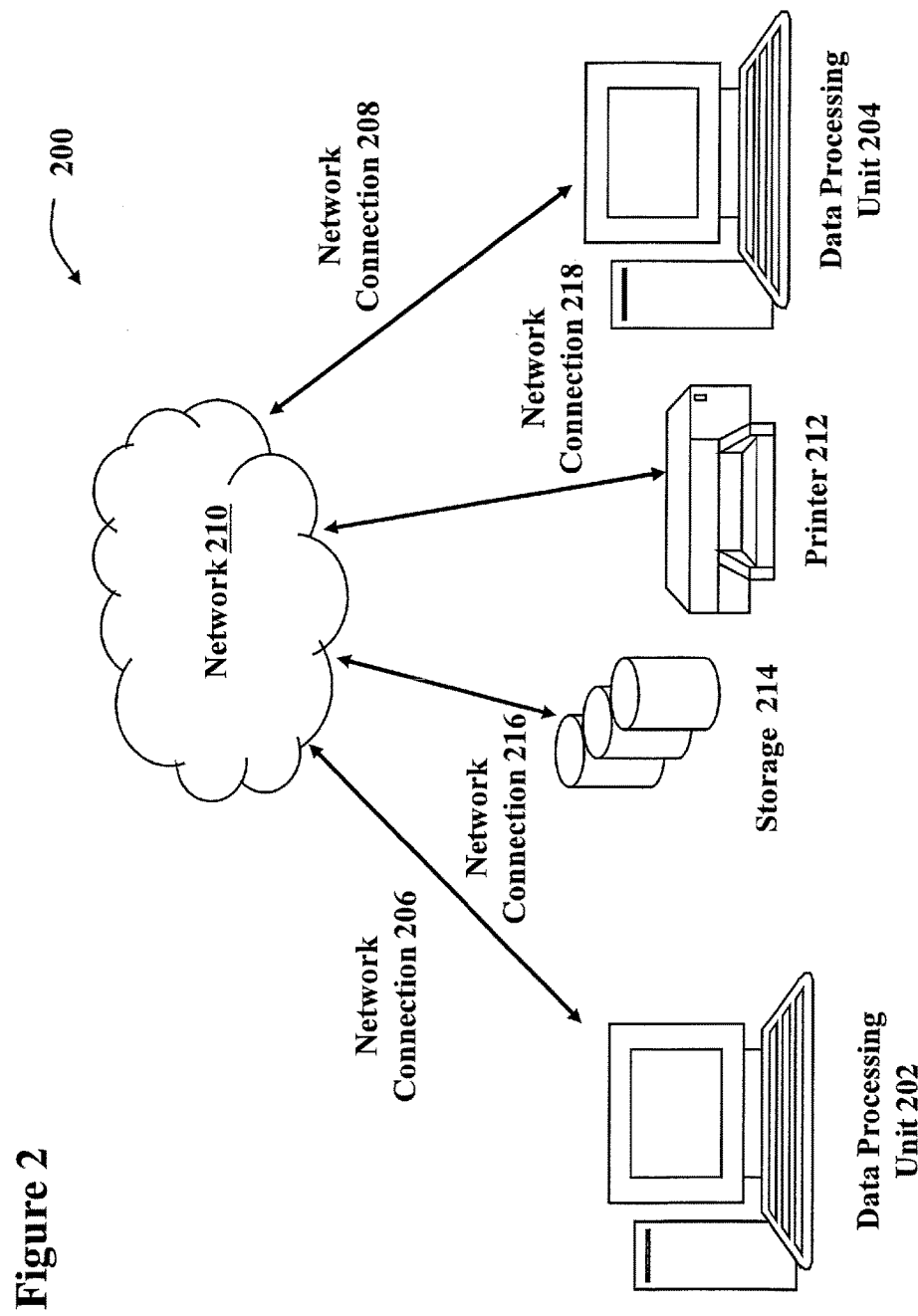
FIG. 2 shows a network for implementing an embodiment of the present invention.

FIG. 2 shows a network system 200 for implementing an embodiment of the present invention. Network system 200 may have a network 210 or group of interconnected computers, such as data processing units 202, 204, via network connections 206, 208 and may be of the type, e.g., a local area network (LAN) or internetwork. Printer 212 and storage 214 may be connected to network 210 via network connections 216, 218. Basic network components may include network interface cards, repeaters, hubs, bridges, switches and routers. Data processing units 202, 204 may be computers such as web servers or personal computers, or other user agents. A web server generally has hardware and software that are responsible for accepting HTTP requests from clients (user agents such as web browsers), and serving them HTTP responses along with optional data contents, which usually are web pages such as HTML documents and linked objects (images, etc.). In this document, the term "web browser" is used but any application for retrieving, presenting, and traversing information resources on the Internet must be considered.

A solution template enables flexible method architecture to facilitate method adoption to build hybrid solutions. The solution template externalizes concerns—tasks, work products, roles, guidance—for a specific solution types from the base method/delivery process. A base delivery process only contains the most common set of activities, tasks, work product, roles, and guidance. The present invention modularizes the method content and externalizes the variation from the commonality. The solution template has two parts: method content specific to solution type—externalizes from the base delivery process (WBS) and placeholders in the base delivery process for various parts of the solution templates. During method adoption workshop one can assemble the delivery process specific to project such as selecting the base delivery process, selecting a set of solution templates for corresponding to each of solution types involved in the overall client solution, and assembling and tailoring the solution template.

The present invention of solution template is driven by simplicity in usage over reuse of content during method authoring granularity, specificity, practitioner friendliness, focusing on method usage versus method authoring and ability to build industry templates for solutions harvested from projects. Solution templates are context-specific pluggable extensions to a base work breakdown structure (WBS) or delivery process that are non-unitary (does not appear in one place in the delivery process in which it is plugged in). A work breakdown structure (WBS) in project management and systems engineering, is a tool used to define and group a project's discrete work elements in a way that helps organize and define the total work scope of the project.

Figure 3:
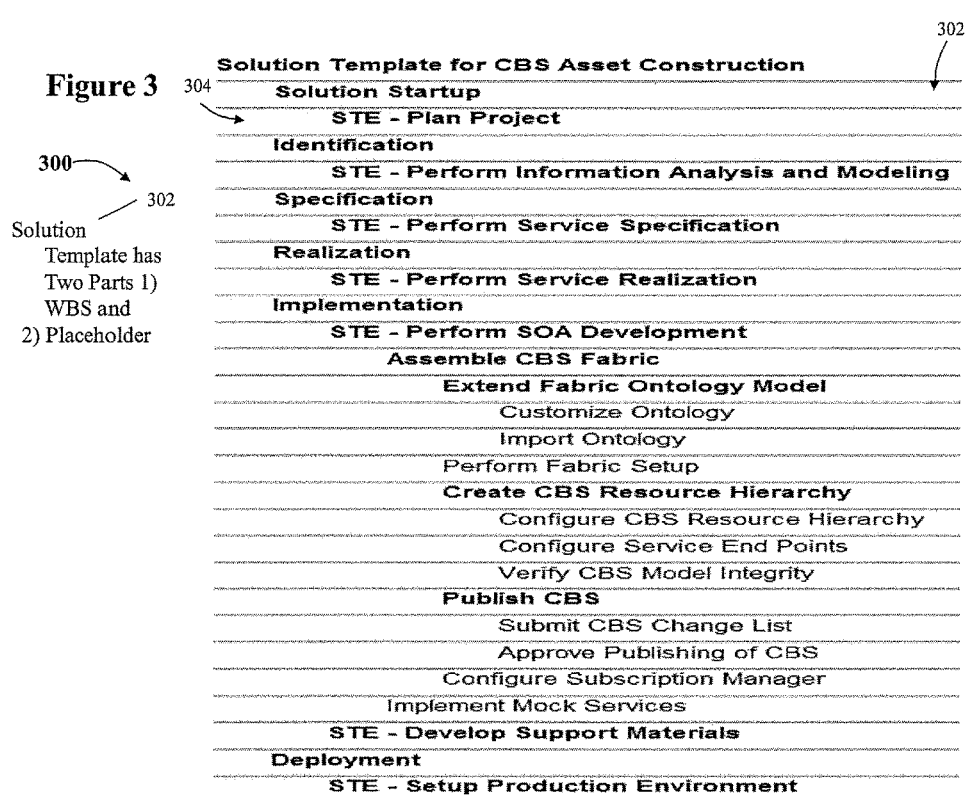
FIG. 3 illustrates an embodiment of a solution template of the present invention for a solution type, namely, composite business services (CBS) asset construction.

One embodiment of the method 300 of the present invention is shown in FIG. 3 shows the work breakdown structure (WBS) 304 of the solution template 302 for a specific solution type, namely, CBS asset construction. This illustrative solution template for CBS asset construction 302 has such set of activities and tasks specific to CBS asset constructions for various phases of the base method for example SOMA method. These phases of SOMA may be a) Solution Startup phase where the project may be planned, defined and initiated, b) Identification phase where fundamental constructs of a solution, namely, services, business process/flow, components, information, and business rules and policies, c) Specification phase where the specification for the solution in terms of the above fundamental constructs may be developed, d) Realization phase where services and the overall solution realization is performed, e) Implementation phase where services and the overall solution are implemented. The work breakdown structure of the solution template prescribes set of specific activities and tasks required for CBS asset construction as part of the overall solution. For example in the Implementation phase, the specific activities and tasks required for CBS asset construction are assembling CBS fabric by extending the fabric ontology (customizing the ontology, importing the ontology and performing fabric setup), creating a CBS resource hierarchy by configuring the CBS resource hierarchy, configuring the service end points and verifying the CBS model integrity, and publishing the CBS including submitting the CBS change list, approving publishing of the CBS, configuring of the subscription manager, and implementing mock services. The solution template for CBS asset construction further includes specific set of tasks for developing support materials, and setting up the production environment in the Implementation phase. Note WBS of the solution template is the first part of solution template construct of the present invention.

Figure 4:
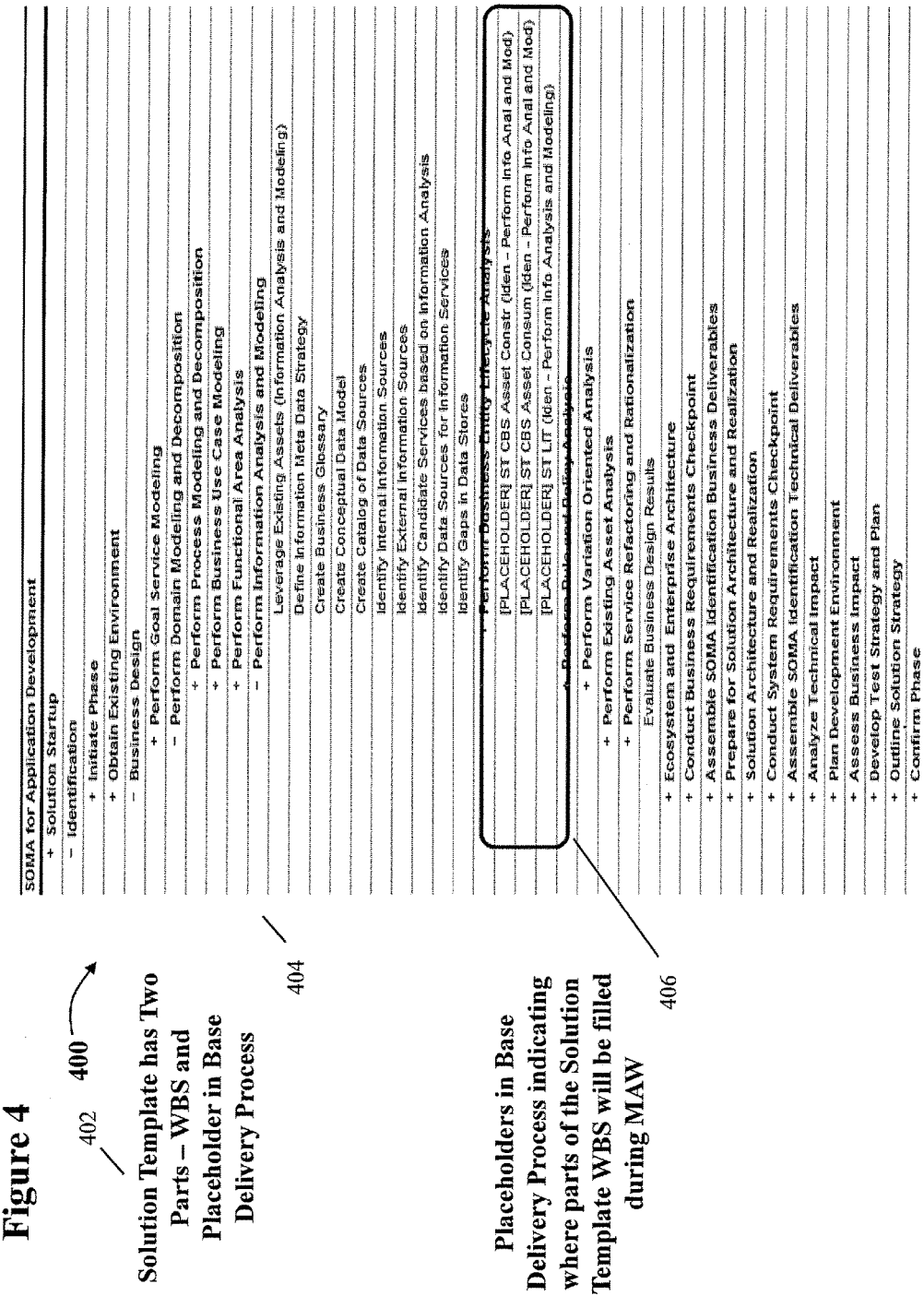
FIG. 4 illustrates an embodiment of a base software development process, such as SOMA for application development, for building end-to-end solutions leveraging solution templates of the present invention

Another embodiment of the present invention of the method 400 of the present invention is shown in FIG. 4 which shows a solution template 402 for CBS asset construction having placeholders 406 in the work breakdown structure of base delivery process 404. Placeholders 406 indicate where parts of the solution template 402 work breakdown structure (WBS) will be filled during method adoption workshop (MAW). Note the placeholders for a corresponding solution templates in the base method is the second part of the solution template construct of the present invention.

Figure 5:
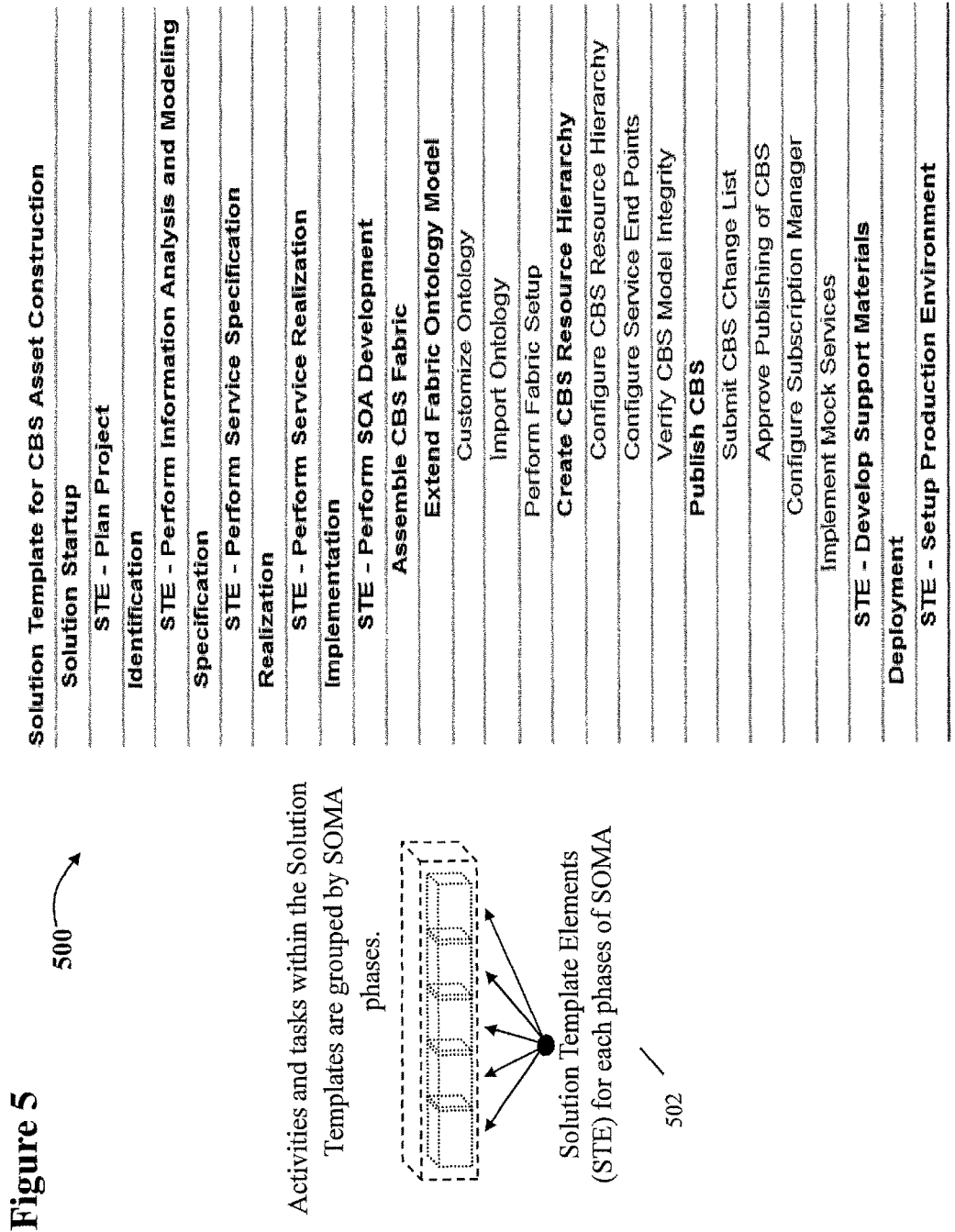
FIG. 5 illustrates another embodiment of a solution template of the present invention for a specific solution type, namely, composite business service (CBS) asset reconstruction and constituent solution template elements (STEs) for each phases of the base software development method such as SOMA method.

FIG. 5 shows a solution template 500 for CBS asset construction where activities and tasks within the solution template are grouped by SOMA phases and these groups are called solution template elements (STEs) 502. Each solution template elements (STE) in the work breakdown structure (WBS) of solution template 500 corresponds to placeholders in the base delivery process.

Figure 6:
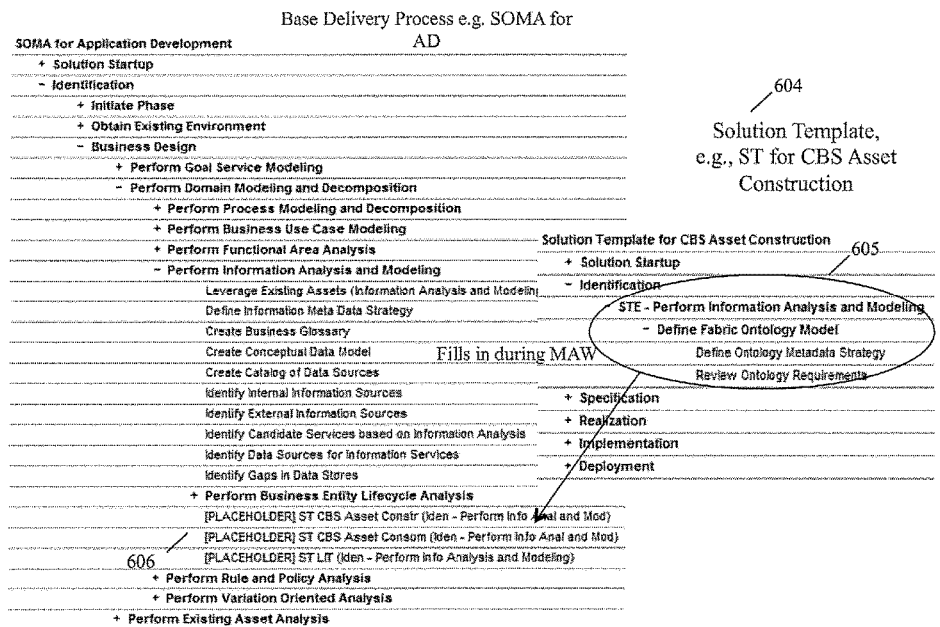
FIG. 6 illustrates another embodiment of a base delivery process, such as SOMA for application development, having placeholders for solution templates of the present invention.

FIG. 6 illustrates a base delivery process 600 that has placeholders 606 for solution templates 602. A part of the solution template 604 fills in (contributes to) the placeholders 606. For example, as shown in FIG. 6, from the solution template, e.g., solution template for CBS Asset Construction 604, certain data may be filled in to the placeholders 606 during MAW, such as "Define Fabric Ontology Model" element 605. It may include pluggable elements for the rest of the lifecycle for the base delivery process.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion—to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method to architect and design extensible methods and processes to build hybrid systems, the method comprising:

forming a universal base delivery process from a plurality of individualized standalone delivery processes by combining the plurality of individualized delivery processes and extracting from the combining, using a computing device, content specific to each individualized delivery process of the plurality of individualized delivery processes, leaving the universal base delivery process that has content that is most common to the plurality of individualized delivery processes and externalizing variations from commonality in the content;

inserting, using the computing device, a set of placeholders in the universal based delivery process, each placeholder of the set of placeholders being inserted into a location in the universal delivery process from which the content specific to the individualized delivery process was extracted;

creating, using the computing device, a plurality of solution templates corresponding to the plurality of individualized delivery processes, each solution template being a context-specific pluggable extension to the universal base delivery process that is non-unitary and has including the content specific to a particular individual delivery process that was extracted and an indicator corresponding to the placeholder from which the content specific to the particular individual deliver process was extracted, wherein each solution template of the plurality of solution templates is a pluggable extension to the universal base delivery process; and assembling, using the computing device, in response to a selection of a solution type of a hybrid solution, a hybrid solution delivery process by incorporating the content specific to a plurality of individual delivery processes necessary to form the hybrid solution delivery process from a plurality of solution templates corresponding to the plurality of individual delivery processes into the universal based delivery process.

2. The method as defined in claim 1 further comprising selecting the base delivery process.

3. The method as defined in claim 2 further comprising selecting a set of solution templates for corresponding to each of solution types involved in the overall client solution.

4. The method as defined in claim 3 further comprising assembling and tailoring using the placeholders as guidance to incorporate corresponding parts of work breakdown structure (WBS) from the selected solution templates into the selected base delivery process.

5. The method as defined in claim 4 wherein the content further comprises activities, tasks, roles, work products.

6. The method as defined in claim 1 further comprising utilizing the placeholders in the base delivery process for various parts of solution templates as a prescriptive guidance as to where to locate/plug-in additional method content and process elements in the base delivery process for various solution types.

7. A computer program product stored on a computer storage system device for implementing a method to architect and define extensible methods and processes to build hybrid solutions which, when executed by a computer device, performs a method, comprising:

forming a universal base delivery process from a plurality of individualized standalone delivery processes by combining the plurality of individualized delivery processes and extracting from the combining, using a computing device, content specific to each individualized delivery process of the plurality of individualized delivery processes, leaving the universal base delivery process that has content that is most common to the plurality of individualized delivery processes and externalizing variations from commonality in the content;

inserting a set of placeholders in the universal based delivery process, each placeholder of the set of placeholders being inserted into a location in the universal delivery process from which the content specific to the individualized delivery process was extracted;

creating a plurality of solution templates corresponding to the plurality of individualized delivery processes, each solution template being a context-specific pluggable extension to the universal base delivery process that is non-unitary and has the content specific to a particular individual delivery process that was extracted and an indicator corresponding to the placeholder from which the content specific to the particular individual deliver process was extracted, wherein each solution template of the plurality of solution templates is a pluggable extension to the universal base delivery process; and assembling, in response to a selection of a solution type of a hybrid solution, a hybrid solution delivery process by incorporating the content specific to a plurality of individual delivery processes necessary to form the hybrid solution delivery process from a plurality of solution templates corresponding to the plurality of individual delivery processes into the universal based delivery process.

8. The computer program product as defined in claim 7, the method further comprising selecting the base delivery process.

9. The computer program product as defined in claim 8, the method further comprising selecting a set of solution templates for corresponding to each of solution types involved in the overall client solution.

10. The computer program product as defined in claim 9, the method further comprising assembling and tailoring using the placeholders as guidance to incorporate corresponding parts of work.

11. The computer program product as defined in claim 10, the method further comprising breaking down structure from the selected solution templates into the selected base delivery process.

12. The computer program product as defined in claim 11, the method further comprising utilizing the placeholders in the base delivery process for various parts of solution templates as a prescriptive guidance as to where to locate/plug-in additional method content and process elements in the base delivery process for various solution types.

13. A method for deploying a computing infrastructure comprising integrating computer-readable code into a computing system, wherein the code in combination with the computing system is capable of performing a process of architecting and defining extensible methods and processes to build hybrid solutions, the process comprising:

forming a universal base delivery process from a plurality of individualized standalone delivery processes by combining the plurality of individualized delivery processes and extracting from the combining, using a computing device, content specific to each individualized delivery process of the plurality of individualized delivery processes, leaving the universal base delivery process that has content that is most common to the plurality of individualized delivery processes and externalizing variations from commonality in the content;

inserting, using the computing device, a set of placeholders in the universal based delivery process, each placeholder of the set of placeholders being inserted into a location in the universal delivery process from which the content specific to the individualized delivery process was extracted;

creating, using the computing device, a plurality of solution templates corresponding to the plurality of individualized delivery processes, each solution template being a context-specific pluggable extension to the universal base delivery process that is non-unitary and has the content specific to a particular individual delivery process that was extracted and an indicator corresponding to the placeholder from which the content specific to the particular individual deliver process was extracted, wherein each solution template of the plurality of solution templates is a pluggable extension to the universal base delivery process; and assembling, using the computing device, in response to a selection of a solution type of a hybrid solution, a hybrid solution delivery process by incorporating the content specific to a plurality of individual delivery processes necessary to form the hybrid solution delivery process from a plurality of solution templates corresponding to the plurality of individual delivery processes into the universal based delivery process.

14. The method as defined in claim 13 wherein the process further comprises selecting the base delivery process.

15. The method as defined in claim 14 wherein the process further comprises selecting a set of solution templates for corresponding to each of solution types involved in the overall client solution.

16. The method as defined in claim 15 wherein the process further comprises assembling and tailoring using the placeholders as guidance to incorporate corresponding parts of work.

17. The method as defined in claim 16 wherein the process further comprises breaking down structure from the selected solution templates into the selected base delivery process.

18. The method as defined in claim 17 wherein the content further comprises activities, tasks, roles and work products.

19. The method as defined in claim 16 wherein the process further comprises utilizing the placeholders in the base delivery process for various parts of solution templates as a prescriptive guidance as to where to locate/plug-in additional method content and process elements in the base delivery process for various solution types.

* * * * *